United States Patent [19]

Foster et al.

[11] 3,893,041

[45] July 1, 1975

[54] OSCILLATING POWER SWITCHING CIRCUIT FOR ALTERNATELY ENERGIZING TWO LIGHTS

[76] Inventors: Charles C. Foster, 6531 Riverton Ave., North Hollywood, Calif. 91606; Leonard W. Hughes, 6566 Tyrone Ave., Van Nuys, Calif. 91401

[22] Filed: Sept. 4, 1973

[21] Appl. No.: 393,990

Related U.S. Application Data

[63] Continuation of Ser. No. 151,385, June 9, 1971, abandoned.

[52] U.S. Cl. .................... 331/45; 331/56; 331/75; 331/111; 340/83
[51] Int. Cl. ............................................. H03k 3/26
[58] Field of Search ............ 340/83; 331/56, 75, 45, 331/111; 307/240, 241, 293, 215

[56] References Cited
UNITED STATES PATENTS
3,328,724  6/1967  Way .............................. 331/111 X
3,631,392  12/1971  Zelina ....................... 340/248 D X

*Primary Examiner*—Siegfried H. Grimm

[57] ABSTRACT

A pulse generating and power switching-circuit especially for high intensity warning lights alternately operated at timed intervals, and characterized by a pair of alternately conductive electronic switching modules each pulsing a power circuit to energize a light, said modules being functionally interdependent while the lights controlled thereby are separately and/or independently operable as circumstances require.

8 Claims, 3 Drawing Figures

NAND GATE

INVENTORS.
CHARLES C. FOSTER
LEONARD W. HUGHES

By

OSCILLATING POWER SWITCHING CIRCUIT FOR ALTERNATELY ENERGIZING TWO LIGHTS

This is a continuation of application Ser. No. 151,385 filed June 9, 1971, and now abandoned.

BACKGROUND

Battery operated flashers involving electronic controlled circuitry are widely used, in the operation of highway warning devices and the like, but with deficient intensity in the projection of light. Such systems are either independent of or incorporated in vehicle lighting systems, and in any case the energy source is limited when such devices are related to vehicles and the like as warning devices employed in emergency situations. That is, the power supply of electrical energy is limited in such cases; and therefore current conservation is essential and which has resulted in the wide use of transistorized circuits and the use of low intensity lights which draw minimal current. Furthermore, there are emergency conditions where low intensity illumination is ineffective, such as for example, in remote areas where vehicles such as trucks are normally operated at high rates of speed and in which case a breakdown demands an early warning to approaching motorists if at all possible. Therefore, it is an object of this invention to provide an intermittent warning light of high intensity that is flashed and projected a substantial distance as an early warning signal to approaching motorists when any danger is presented along a highway or the like as caused by an accident, breakdown or collision.

An object of this invention is to provide a light beam disposition and separation whereby maximum practical use is obtained through the use of two concentrated beams of light that are alternately activated. With the present invention, the beam axes of the two lights respectively are coordinated with the horizontal or plane of the road and with the separation angle therebetween.

Another object of this invention is to provide interdependent electronic switching circuits, each having a switching cycle adapted to energize a warning light only when in circuit therewith, and consequently draining current only when usefully employed. With the present invention, the failure of one light does not affect the other, nor does removal of one light from the circuitry permit a continuing current drain.

It is also an object of this invention to provide modular circuitry of the character thus far referred to in which a pair of identical means are interconnected and interdependent for their sequentially continuous intermittent operation. With the present invention, the switching operation of one means is terminated with triggering of the switch operation of the other means, and so on; with the lights energized only when in the circuit of the means controlling the same.

DRAWINGS

The various objects and features of this invention will be fully understood from the following detailed description of the typical preferred form and application thereof, throughout which description reference is made to the accompanying drawings, in which.

PREFERRED EMBODIMENT

The alternating emergency lights of the present invention are high intensity lights as distinguished from inferior lighting of low current drain, and consequently requires circuitry adapted to the limited supply of electrical energy available in emergency situations. Therefore, this invention is characterized by an optimum interrelated disposition of the two lights involved and is characterized by the interdependent circuitry which advantageously directs all electrical energy to the purpose of the emergency lighting. Consequently, the high intensity beams of light are far reaching as an "early warning system" for a maximum length of time.

Referring now to the optimum interrelated disposition and penetrating character of the lighting employed herein, a pair of or two identical lights are employed; preferably spot light units DS1 and DS2 of high candle power that cast concentrated beams of light having a spread of, for example, 6° within the included angle of the cone of said light beam. The usual incandescent lighting filaments are used as the lenses are clear so as to project an optimum beam from the reflector designed for said purpose. Therefore, a large circuit drain is to be expected while these lights are energized and which would deplete a battery power supply in short order if the current loads were continuous. Accordingly therefore, the current is to be applied intermittently and alternately to each of said spot light units DS1 and DS2, and in each instance for a short length of time with a long dwell between energizations.

Figure 1:
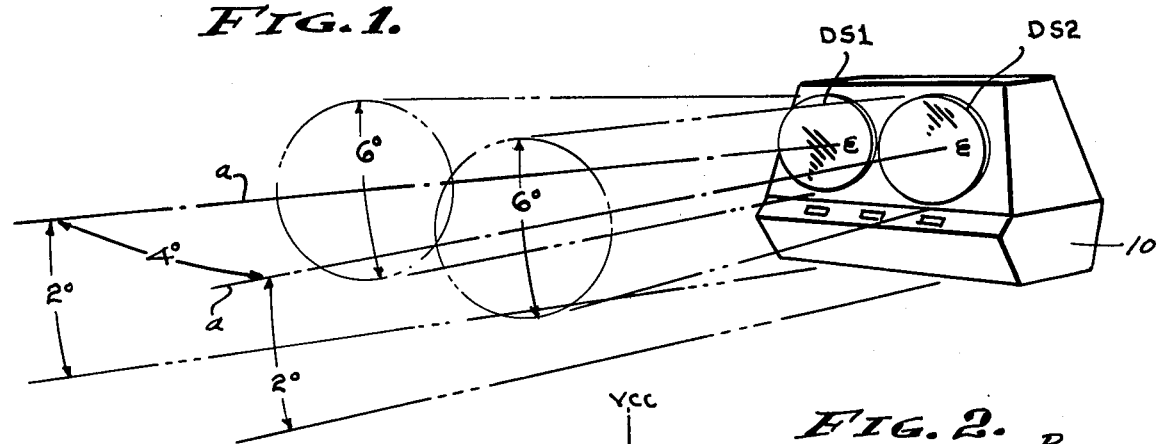
FIG. 1 is a perspective view of the composite apparatus of the present invention and which includes therein the high intensity emergency lights and the interdependent means circuitry therefor, and illustrating the divergent axes of the light beams.

Referring to FIG. 1 of the drawings and to the physical embodiment of the present invention, the pair of two spot lights DS1 and DS2 are accommodated in a housing 10 which carries the batteries B and the control circuit module C that controllably operates the spot lights to alternately flash them on for short intervals of time separated by long dwells of time. As shown, each spot light projects a light beam along an axis $a$ with a 3° radial deviation, and in accordance with the invention the axes $a$ of the two spot lights are angularly separated not to exceed the total radial deviation of the said two projected light beams, for example a 4° angular separation of the axes and to the end that there is a substantial vertical overlap of the adjacent beams. Further, the two beam axes are inclined so as to elevate the beams above the horizontal or road level upon which the housing 10 is supported, and to this end the axes $a$ are, for example, angularly inclined 2° with a substantial lower portion of the beams spreading onto the roadway. Thus, the beams of spot lights DS1 and DS2 can be aimed along a roadway and projected to their effective infinity, and/or as far as the straightness of said roadway will permit.

Referring now to control circuit module C and battery power supply B, one or more power supplies B are selectively connected into the energizing side of the circuitry, the other side of which is grounded as are the power supplies. In practice, each power supply B is comprised of four 1½ volt dry cells, thereby establishing a six volt potential between S1 and S3 and ground; S1 and S3 being switches for selectively energizing each of the two spot lights DS1 and DS2. A selector switch S2 is provided to connect the positive terminal of either battery BA1 or BA2.

The circuitry of control module C is designed, for example, to energize each spot light DS1 or DS2 for ¼ second at alternate two second intervals, or in other words to energize one of said spot lights every one second; and without interrupting the energization of one spot light when the other is inoperative for any reason. Thus, the characteristic feature of this circuit is that the two sections or switching means thereof are interdependent for their timed intervals while the power circuitry therethrough remains separately independent. Consequently, there is a drain of power from either circuit only when its spot light is in continuity therewith. The circuitry hereinafter disclosed is embodied in a transistorized printed circuit board (not shown) incapsulated in a plastic solid so as to be waterproof and impact resistant.

With the switches S1, S2 and S3 closed, the circuit of control module C is as follows: There is a pair of two opposite and alternately acting switching circuits, each of which involves integrated quadruple NAND gates as disclosed in FIG. 3. When the circuits are energized, terminal 11 of 1D (or terminal 3 of 2A) will be in a 1 state as a result of random action. As shown, NAND gates 1D and 2A comprise a flip-flop circuit, while NAND gates 1A and 1B comprise a 1-shot circuit that changes state when triggered and then returns to its original state. NAND gates 2C and 2D comprise a 1-shot circuit for the other switching means. The NAND gates 1C and 2B are the interacting inverters for the switching means comprised of Q3 and Q4 and related elements, a flip-flop timing circuit acting to reverse the state of the signals. The transistors Q1 and Q6 are responsive to the last mentioned flip-flop respectively to alternately turn on and off.

Assuming 2A-3 to be in a 1 state, a voltage is applied to Q3-B2, and also to C2 and to Q3-E through a suitable resistor R4, during which time there is a time interval dwell when capacitor C2 is charged and whereupon Q3 fires so as to discharge voltage through Q3-E causing a positive going pulse at Q3-B1 which is across a resistor R3, and also a positive going pulse at 1C-9 and 10 thereby changing their state from a 0 to a 1. This causes 1C-8, 1D-12 and 1B-5 to go to a 0 state whereupon 1D-11 goes from a 0 to a 1 state and 2A-3 goes from a 1 to a 0 state and thereby starting capacitor C3 to charge through R5 and stopping the charging of capacitor C2 through resistor R4 and causing 1B-6 to go from 0 to a 1 state applying a voltage to Q1-B through a limiting resistor R1 so that Q1 conducts and turns on DS1. Simultaneously, capacitor C1 commences to charge through resistor R2 and reaching a sufficient voltage level at Q2-B causes Q2 to conduct and 1A-2 to go to a 0 state which in turn causes 1A-3 and 1B-4 to go to a 1 state. When 1B-4 goes to a 1 state, 1B-6 is driven to a 0 state which removes the voltage from Q1-B and it stops conducting so as to turn DS1 off; and with 1B-6 in a 0 state Q2 will stop conducting and thereby return 1A-1 to a 1 state so as to rest the 1-shot circuit.

During the foregoing operation of the circuitry in the one switching circuit, the capacitor C3 has been charging and when charged to its triggering voltage level in Q4-E it fires Q4 and toggles the flip-flop 1D and 2A. The operation of the other switching circuits involving the NAND gates 1D through 2D to energize DS2 is the same as above described involving the operation of the NAND gates 1A through 1D.

The two switching circuits hereinabove described alternately energize the spot lights DS1 and DS2 and the energization of one has no affect upon the energization of the other. Therefore, a nonuse or malfunction of either DS1 or DS2 does not cause a drain on the power supply B, with a consequent conservation of the power supply energy for useful purposes in operating the remaining spot light.

Figure 2:
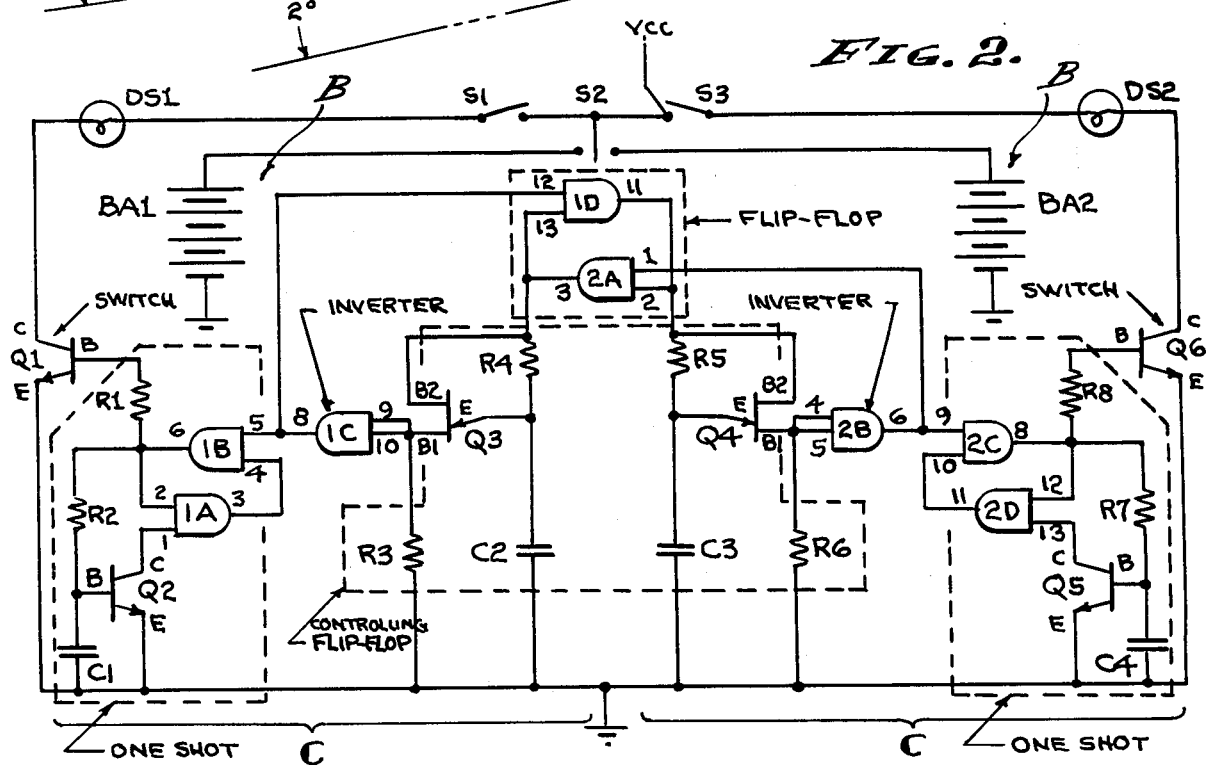
FIG. 2 is a schematic electrical diagram of the interdependent means circuitry of the apparatus shown in FIG. 1.
Figure 3:
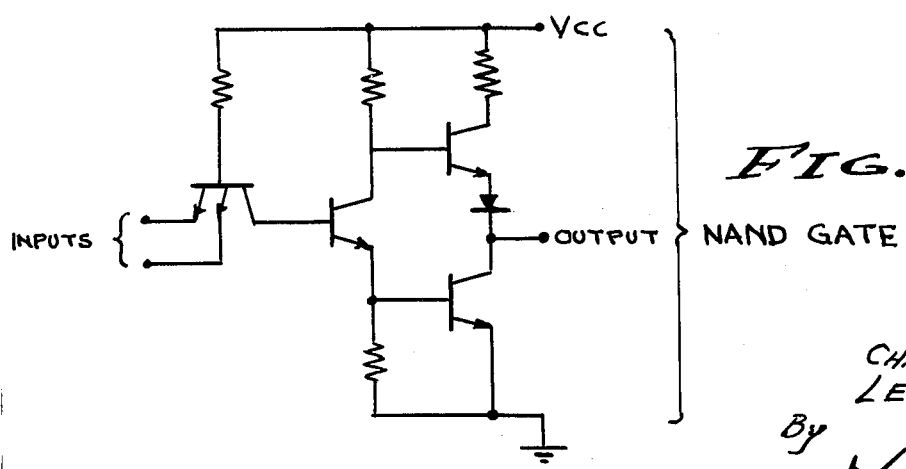
FIG. 3 is a detailed diagram of the NAND gates employed in the circuitry of FIG. 2.

It is significant that the two quadruple NAND gates as shown individually in FIG. 3 are combined as shown in FIG. 2 to be cooperatively interdependent; by establishing therebetween the initiating flip-flop comprised of NAND gates 1D and 2A of the two interrelated modules; by reserving to each module the switching control means comprised of NAND gates 1A-1B and 2C-2D respectively, also by reserving the switching transistors Q1 and Q6 to each module respectively; by establishing therebetween the controlling flip-flop comprised of the transistors Q3 and Q4 of the two interrelated modules; and by reserving the inverter NAND gates 1C and 2B to each module respectively. Thus, there are two flip-flops which are comprised of cooperative NAND gates of the two interrelated modules C, while the switching transistors remain independently operable in each module as controlled by its independent switch control circuit governed by the separate inverters operating dependently upon the timing flip-flop associated directly therewith. It is a pair of modular circuits comprised of the four integrated NAND gates of FIG. 3 which are used to utmost advantage in combination to intermittently close the switching transistors Q1 and Q6, each to control a power circuit independent of the other and not dependent upon the use of power in either instance.

We claim:
1. Interdependent power circuits with a pair of alternately operable load elements requiring electrical power for their operation;

a grounded power source,
a flip-flop circuit means comprising first and second interconnected NAND gates and each with a first interlocking input, a second controlling input and an output, the first interlocking input of each being connected to the output of the other,
a pair of switching circuit means and each comprising a unijunction transistor with its emitter connected into a time determination resistorcapacitor network, each of said networks being connected to the output of a corresponding one of said flip-flop NAND gates respectively,
a pair of inverters and each comprised of a NAND gate with an input and an output, and with the input connected to a base of a corresponding one of said unijunction transistors,
a pair of alternately operable pulse generating one-shot circuits and each comprised of a "set" and a "reset" NAND gate, a "reset" transistor and a timing resistor-capacitor network, the "set" NAND gate having first and second inputs and an output with the first input connected to both the output of a corresponding one of said inverter NAND gates and to the second controlling input of the other of said flip-flop NAND gates, the "reset" NAND gate having first and second inputs and an output with the first input connected to the output of the set NAND gate and to the timing resistor-capacitor network and with the output connected to the second input of the set NAND gate, the reset transistor with its emitter connected to ground and with its collector connected to the second input of the reset NAND gate and with its base connected into the "timing" resistor-capacitor network, a pair of power switching transistors and each with its emitter connected to ground, with its base connected to the output of a corresponding one of said set NAND gates, and with its collector connected through a corresponding one of said load elements to the power source, whereby the interdependent power circuits are alternately triggered at rates determined by the time constants of said pair of switching circuit means, and power is applied through each load element for time periods determined by a corresponding one of said one-shot circuits.

2. The interdependent pulse generating and alternately operable power circuitry as set forth in claim 1 wherein said base of said unijunction transistor of each switching circuit is connected to ground through a current limiting resistor.

3. The interdependent pulse generating and alternately operable power circuitry as set forth in claim 1 wherein the emitter of each switching circuit unijunction transistor connects into the time determination resistor-capacitor network between said resistor and said capacitor.

4. The interdependent pulse generating and alternately operable power circuitry as set forth in claim 1 wherein the emitter of each switching circuit unijunction transistor connects into the time determination resistor-capacitor network between said resistor which is connected to the output of said corresponding one of said flip-flop NAND gates and said capacitor which is connected to ground.

5. The interdependent pulse generating and alternately operable power circuitry as set forth in claim 1, wherein said base of said unijunction transistor of each switching circuit is connected to ground through a current limiting resistor, and wherein the emitter of each switching circuit unijunction transistor connects into the time determination resistor-capacitor network between said resistor which is connected to the output of said corresponding one of said flip-flop NAND gates and said capacitor which is connected to ground.

6. The interdependent pulse generating and alternately operable power circuitry as set forth in claim 1 wherein the base of the reset transistor connects into the timing resistor-capacitor network between said resistor and said capacitor.

7. The interdependent pulse generating and alternately operable power circuitry as set forth in claim 1 wherein the base of the reset transistor connects into the timing resistor-capacitor network between said resistor which is connected to the output of said corresponding one of said set NAND gates and said capacitor which is connected to ground.

8. The interdependent pulse generating and alternately operable power circuitry as set forth in claim 1 wherein the base of each power switching transistor is connected to the output of said corresponding one of said set NAND gates through a current limiting resistor.

* * * * *